United States Patent
Ellul et al.

(10) Patent No.: US 6,451,915 B1
(45) Date of Patent: Sep. 17, 2002

(54) THERMOPLASTIC ELASTOMERS HAVING IMPROVED PROCESSING AND PHYSICAL PROPERTY BALANCE

(75) Inventors: Maria D. Ellul, Silver Lake Village; Paul E. McDaniel, Cuyahoga Falls; Thomas L. Peltier, Akron; Jianya Cheng, Fairlawn, all of OH (US); Patrick Brant, Seabrook; Armenag H. Dekmezian, Kingwood, both of TX (US)

(73) Assignees: Advanced Elastomer Systems, L.P., Akron, OH (US); ExxonMobil Chemical Patents, Inc., Houston, TX (US)

( * ) Notice: Subject to any disclaimer, the term of this patent is extended or adjusted under 35 U.S.C. 154(b) by 6 days.

(21) Appl. No.: 09/752,080

(22) Filed: Dec. 29, 2000

(51) Int. Cl.$^7$ .............................. C08L 21/00; C08L 23/00
(52) U.S. Cl. ...................... 525/191; 525/203; 525/216; 525/232; 525/240; 525/241
(58) Field of Search ................................ 525/191, 203, 525/216, 232, 240, 241

(56) References Cited

U.S. PATENT DOCUMENTS

| | | | |
|---|---|---|---|
| 2,972,600 A | 2/1961 | Braidwood | 528/129 |
| 3,287,440 A | 11/1966 | Giller et al. | 525/139 |
| 4,130,535 A | 12/1978 | Coran et al. | |
| 4,311,628 A | 1/1982 | Abdou-Sabet et al. | |
| 4,594,390 A | 6/1986 | Abdou-Sabet et al. | 525/232 |
| 5,100,947 A | 3/1992 | Puydak et al. | 524/423 |
| 5,157,081 A | 10/1992 | Puydak et al. | 525/237 |
| 5,196,462 A | 3/1993 | Berta | 524/94 |
| 5,290,886 A | 3/1994 | Ellul | 524/515 |
| 5,397,832 A | 3/1995 | Ellul | 514/515 |
| 5,621,045 A | 4/1997 | Patel et al. | 525/237 |
| 5,656,693 A | 8/1997 | Ellul et al. | 525/171 |
| 5,936,028 A | 8/1999 | Medsker et al. | 524/506 |
| 6,245,856 B1 * | 6/2001 | Kaufman et al. | 525/240 |

FOREIGN PATENT DOCUMENTS

EP 0 300 689 A 1/1989

OTHER PUBLICATIONS

"Determination of the Crosslink Density of Conductive Ternary Rubber Vulcanizates by Solvent Penetration," Materials Letters, 28, Sep. 1996, pp. 207–213.

"Chemical Surface Treatments of Natural Rubber and EPDM Thermoplastic Elastomers: Effects on Friction and Adhesion", Rubber Chemistry and Technology, vol. 67, No. 4 (1994).

* cited by examiner

*Primary Examiner*—Nathan M. Nutter
(74) *Attorney, Agent, or Firm*—Arthur M. Reginelli; William A. Skinner

(57) ABSTRACT

A thermoplastic elastomer formed by a process comprising the steps of dynamically vulcanizing a rubber within a mixture that includes the rubber, from about 10 to about 80 percent by weight of a thermoplastic resin based upon the total weight of the rubber and the thermoplastic combined, and from about 1 to about 25 percent by weight of a polymeric processing additive based upon the total weight of the rubber and the thermoplastic combined, where the polymeric processing additive is a linear polyolefin resin that has an melt flow rate that is greater than about 1,000 dg/min, a diene-modified polyolefin polymer that has an melt flow rate that is greater than about 1,000 dg/min, from about 0.005 to about 2.00 mole percent polymeric units deriving from dienes, and a viscosity average branching index that is from about 0.4 to about 0.95, or a mixture of the linear polyolefin resin and the diene-modified polyolefin polymer, where the step of dynamically vulcanizing the rubber results in vulcanized rubber having a crosslink density of about 40 to about 180 mole per milliliter of rubber.

19 Claims, No Drawings

THERMOPLASTIC ELASTOMERS HAVING IMPROVED PROCESSING AND PHYSICAL PROPERTY BALANCE

TECHNICAL FIELD

The present invention is generally directed toward thermoplastic elastomers and processes for making the same. These thermoplastic elastomers have improved processing properties. Specifically, the thermoplastic elastomers include a rubber that is at least partially cured, a thermoplastic resin, and a polymeric processing additive. The polymeric processing additive is a thermoplastic resin that has a very high melt flow index.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which maybe characterized by finely-divided rubber particles dispersed within a plastic. These rubber particles are crosslinked to promote elasticity. Thermoplastic vulcanizates are conventionally produced by dynamic vulcanization, which is a process whereby a rubber is cured or vulcanized within a blend with at least one non-vulcanizing polymer while the polymers are undergoing mixing or masticating at some elevated temperature, preferably above the melt temperature of the non-vulcanizing polymer.

The presence of the rubber, however, makes these thermoplastic vulcanizates difficult to process after dynamic vulcanization. As a result, heavier demands are placed upon processing machinery, especially as the amount of rubber within the thermoplastic vulcanizate is increased, which it desirably is in order to maximize the elastomeric behavior.

Conventionally, these processing problems have been alleviated by reducing the amount of cure, by using lower molecular weight thermoplastic resins, or by using processing oils such as paraffinic oils and waxes, processing aids such as metal stearates or fatty acid amides, or surfactants such as sulfate and sulfonate salts.

Because conventional approaches to alleviating processing difficulties can deleteriously impact the mechanical properties of thermoplastic elastomers, there is a need for thermoplastic elastomers that have improved processability without inferior mechanical properties.

SUMMARY OF INVENTION

In general the present invention provides a thermoplastic elastomer formed by a process comprising the steps of dynamically vulcanizing a rubber within a mixture that includes the rubber, from about 10 to about 80 percent by weight of a thermoplastic resin based upon the total weight of the rubber and the thermoplastic combined, and from about 1 to about 25 percent by weight of a polymeric processing additive based upon the total weight of the rubber and the thermoplastic combined, where the polymeric processing additive is a linear polyolefin resin that has an melt flow rate that is greater than about 1,000 dg/min, a diene-modified polyolefin polymer that has an melt flow rate that is greater than about 1,000 dg/min, from about 0.005 to about 2.00 mole percent polymeric units deriving from dienes, and a viscosity average branching index that is from about 0.4 to about 0.95, or a mixture of the linear polyolefin resin and the diene-modified polyolefin polymer, where the step of dynamically vulcanizing the rubber results in vulcanized rubber having a crosslink density of about 40 to about 180 mole per milliliter of rubber.

The present invention also includes a composition comprising a vulcanized rubber a thermoplastic resin, and a polymeric processing additive that has a melt flow rate that is greater than about 500 dg/min.

The present invention further includes a process for forming a thermoplastic elastomer comprising of the step of dynamically vulcanizing a rubber within a mixture that includes the rubber, a thermoplastic resin, and a polymeric processing additive, where said polymeric processing additive includes a linear polyolefin having a melt flow rate that is greater than about 500 dg/min, branched molecules characterized by a viscosity average branching index of less than about 0.85 and melt flow rate that is greater than about 500 dg/min, or a mixture of both the linear polyolefin and the branched molecules.

The thermoplastic elastomers of the present invention advantageously demonstrate an improved processability and surface appearance. Surprisingly, this result has been achieved without deleteriously sacrificing mechanical properties. It has been found that by using relatively small amounts of polymeric processing additives having a very high melt flow rate, the processability of the thermoplastic elastomers can be improved without significantly reducing mechanical properties.

PREFERRED EMBODIMENT FOR CARRYING OUT THE INVENTION

The thermoplastic elastomers of this invention include at least one rubber, at least one thermoplastic resin, and at least one polymeric processing additive. The polymeric processing additive is a resin that has a very high melt flow rate.

Any rubber or mixture thereof that is capable of being crosslinked or cured can be used as the rubber component of the thermoplastic elastomers of this invention. Reference to a rubber may include mixtures of more than one rubber. Some non-limiting examples of these rubbers include elastomeric copolymers, butyl rubber, natural rubber, styrene-butadiene copolymer rubber, butadiene rubber, acrylonitrile rubber, halogenated rubber such as brominated and chlorinated isobutylene-isoprene copolymer rubber, butadiene-styrene-vinyl pyridine rubber, urethane rubber, polyisoprene rubber, epichlolorohydrine terpolymer rubber, and polychloroprene. The preferred rubbers are elastomeric copolymers and butyl rubber.

The term elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. The preferred α-olefins are propylene, 1-hexene, 1-octene or combinations thereof. The diene monomers may include, but are not limited to, 5-ethylidene-2-norbornene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; 5-vinyl-2-norbornene and the like, or a combination thereof. The preferred diene monomers are 5-ethylidene-2-norbornene and 5-vinyl-2-norbornene. In the event that the copolymer is prepared from ethylene, α-olefin, and diene monomers, the copolymer may be referred to as a terpolymer or even a tetrapolymer in the event that multiple α-olefins or dienes are used. The preferred elastomeric copolymers include terpolymers of ethylene, propylene, and 5-ethylidene-2-norbornene.

Elastomeric copolymers are commercially available under the tradenames Vistalon™(Exxon Mobil Chemical Co.; Houston, Tex.), Keltan™ (DSM Copolymers; Baton Rouge, La.), Nordel™ IP (DuPont Dow Elastomers; Wilmington, Del.), BUNA EP™ (Bayer; Germany) and ElastoFlo™ (Union Carbide; Danbury, Conn.).

The term butyl rubber refers to rubbery amorphous copolymers of isobutylene and isoprene or an amorphous terpolymer of isobutylene, isoprene, and a divinyl aromatic monomer. These copolymers and terpolymers should preferably contain from about 0.5 to about 10 percent by weight, or more preferably from about 1 to about 4 percent by weight, isoprene. The term butyl rubber also includes copolymers and terpolymers that are halogenated with from about 0.1 to about 10 weight percent, or preferably from about 0.5 to about 3.0 weight percent, chlorine or bromine. This chlorinated copolymer is commonly called chlorinated butyl rubber. While butyl rubber is satisfactory for the practice of this invention, halogen-free butyl rubber containing from about 0.6 to about 3.0 percent unsaturation is preferred, with butyl rubber having a polydispersity of about 2.5 or below being especially preferred. Butyl rubbers are commercially prepared by polymerization at low temperature in the presence of a Friedel-Crafts catalyst as disclosed within U.S. Pat. Nos. 2,356,128 and 2,944,576. Butyl rubber is commercially available from a number of sources as disclosed in the Rubber World Blue Book. For example, butyl rubber is available under the tradename Polysar Butyl™ (Bayer; Germany) or the tradename Exxon Butyl™ (Exxon Chemical Co.).

The thermoplastic resin is a solid, generally high molecular weight plastic material. Preferably, the resin is a crystalline or a semi-crystalline polymer resin, and more preferably is a resin that has a crystallinity of at least 25 percent as measured by differential scanning calorimetry. Polymers with a high glass transition temperature are also acceptable as the thermoplastic resin. The melt temperature of these resins should generally be lower than the decomposition temperature of the rubber. Reference to a thermoplastic resin will include a thermoplastic resin or a mixture of two or more thermoplastic resins.

The thermoplastic resins preferably have a weight average molecular weight from about 200,000 to about 600,000, and a number average molecular weight from about 80,000 to about 200,000. More preferably, these resins have a weight average molecular weight from about 300,000 to about 500,000, and a number average molecular weight from about 90,000 to about 150,000.

The thermoplastic resins generally have a melt temperature ($T_m$) that is from about 150 to about 175° C. preferably from about 155 to about 170° C. and even more preferably from about 160 to about 170° C. The glass transition temperature ($T_g$) of these resins is from about −5 to about 10° C. preferably from about −3 to about 5° C. and even more preferably from about 0 to about 2° C. The crystallization temperature ($T_c$) of these resins is from about 95 to about 130° C. preferably from about 100 to about 120° C. and even more preferably from about 105 to about 115° C. as measured by DSC and cooled at 10° C./min.

The thermoplastic resins generally have a melt flow rate that is less than about 10 dg/min, preferably less than about 2 dg/min, and still more preferably less than about 0.8 dg/min. Melt flow rate is a measure of how easily a polymer flows under standard pressure, and is measured by using ASTM D-1238 at 230° C. and 2.16 kg load.

Exemplary thermoplastic resins include crystallizable polyolefins, polyimides, polyesters (nylons), poly (phenylene ether), polycarbonates, styrene-acrylonitrile copolymers, polyethylene terephthalate, polybutylene terephthalate, polystyrene, polystyrene derivatives, polyphenylene oxide, polyoxymethylene, and fluorine-containing thermoplastics. The preferred thermoplastic resins are crystallizable polyolefins that are formed by polymerizing α-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

An especially preferred thermoplastic resin is high-crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 10 dg/min and more preferably less that or equal to 1.0 dg/min per ASTM D-1238.

The processing additive employed in the present invention is a polymeric resin that has a very high melt flow index. These polymeric resins include both linear and branched molecules that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Melt flow rate is a measure of how easily a polymer flows under standard pressure, and is measured by using ASTM D-1238 at 230° C. and 2.16 kg load. The thermoplastic elastomers of the present invention may include mixtures of various branched or various linear polymeric processing additives, as well as mixtures of both linear and branched polymeric processing additives. Reference to polymeric processing additives will include both linear and branched additives unless otherwise specified.

The linear polymeric processing additives or resins are preferably polyolefins, and even more preferably isotactic polyolefins. These polyolefins can derive from ethylene or α-olefin monomers having from two to about 10 carbon atoms such as, but not limited to, ethylene, propylene, 1-butene, 1-hexene, and 1-octene. These polyolefins are preferably homopolymers, although copolymers and terpolymers are also contemplated. The most preferred polyolefin is polypropylene.

The linear polymeric processing additives are preferably crystalline or semi-crystalline materials, although amorphous materials may result from certain copolymers. In general, these linear additives will have a melt temperature that is from about 130° to about 180° C., preferably from about 140° to about 170° C., and more preferably from about 150° to about 165° C.

The linear polymeric processing additives may be prepared by several polymerization techniques including, but not limited to, single-site catalysis, Ziegler-Natta catalysis, and other conventional catalysis techniques. In the case of Ziegler-Natta and other conventional techniques, post-reactor treatment is often required.

The linear polymeric processing additives are preferably prepared by polymerizing one or more α-olefin monomers by using a single-site catalyst system. This synthetic method is disclosed in U.S. Pat. Nos. 5,017,714 and 5,120,867, which are incorporated herein by reference.

Any racemic metallocene catalyst may be used to polymerize the linear polymeric additives of this invention. Metallocenes are generally represented by the formula C $P_m MR_n X_q$, where Cp is a cyclopentadienyl ring or derivative thereof, M is a group 4, 5, or 6 transition metal, R is a hydrocarbyl group or hydrocarboxy group having from 1 to 20 carbon atoms, X is a halogen or an alkyl group, and m is an integer from about 1 to about 3, n is an integer from 0 to 3, q is an integer from 0 to 3, and the sum of m, n, and q is equal to the oxidation state of the transition metal. Examples of particularly preferred metallocenes are discussed in U.S. Pat. Nos. 5,580,939; 5,324,800; 5,599,761; 5,276,208; 5,239,022; 5,243,001; 5,057,475; 5,017,714; and 5,120,867. Each of these references are incorporated herein by reference.

The average molecular weight of the polymeric processing additives may be reduced by oxidative degradation or other post-reactor treatment of the polyolefin, which may be referred to as controlled rheology treatment (CR treatment), that will accomplish molecular scission. This may be accomplished by post-reactor treatment with an oxidizing agent, such as organic or inorganic peroxides that will cleave polyolefin polymers. As a result, the average molecular weight of the polymers will be reduced, yet the molecular weight distribution will remain substantially unchanged. This process is described in U.S. Pat. No. 5,736,465, which is incorporated herein by reference.

The linear polymeric processing additives of this invention are recently becoming commercially available. For example, polypropylene having an MFR of about 700 or about 1500 is available under the tradename Achieve™ (Exxon Mobil Chemical Company; Houston, Tex.).

The branched polymeric processing additives are preferably diene-modified polyolefin polymers. These polymers contain polymeric units that derive from α-olefins with monomeric units that derive from dienes dispersed throughout the backbone of the polymer.

These diene-modified polymers can contain from 0.005 to 2.00 mole percent polymeric units deriving from dienes, preferably from 0.01 to about 1.0 mole percent polymeric units deriving from dienes, and more preferably from about 0.02 to about 0.1 mole percent polymeric units deriving from dienes. The remainder of the polymer will typically derive from α-olefins.

Some non-limiting examples of useful diene-modified polymers include propylene copolymers containing 1,9-decadiene, 1,13-tetradecadiene, 1,7-octadiene, and 1,5-hexadiene, as well as the various cyclic and branched dienes.

The branched polymeric processing additives have a weight average molecular weight ($M_w$) from about 25,000 to about 200,000, a number average molecular weight ($M_n$) from about 10,000 to about 70,000, and a z-average molecular weight ($M_z$) from about 60,000 to about 800,000. More preferably, these resins have an $M_w$ from about 40,000 to about 180,000, an $M_n$ from about 25,000 to about 65,000, and an $M_z$ from about 100,000 to about 700,000. Even more preferably, these resins have $M_w$ from about 50,000 to about 170,000, an $M_n$ from about 27,000 to about 60,000, and a $M_z$ from about 150,000 to about 650,000. The molecular weights of the branched polymeric processing additives, as represented by $M_w$, $M_n$, and $M_z$, are determined by using Gel Permeation Chromatography (GPC) with the polymer dissolved in 1,2,4 trichlorobenzene at 145° C., and the instrument calibrated with both polystyrene and low molecular weight polyethylene standards.

These branched additives have a relatively broad polydispersity. Preferably, these resins have a polydispersity, as determined by Mw/Mn, that is greater than about 2.4, more preferably greater than about 2.5, and even more preferably greater than about 2.7. Alternatively, these resins preferably have a polydispersity, as measured by Mz/Mw, that is greater than about 1.8, more preferably greater than about 2.0, and even more preferably greater than about 2.2.

The branched processing additives employed in this invention are highly branched polymeric molecules. Preferably, these polymeric molecules are characterized by having a viscosity average branching index, $\langle g' \rangle_{vis}$, of from about 0.2 to about 0.95, more preferably from about 0.3 to about 0.9, and even more preferably from about 0.5 to about 0.85. The viscosity average branching index, $\langle g' \rangle_{vis}$, which is determined by using GPC-3D analysis (GPC-Light Scattering-Viscometry), is one measurement of the average branching index ($\langle g' \rangle$) of a molecular weight distribution of polymers.

Those skilled in the art appreciate that the branching index ,g', at a given molecular weight is determined according to the formula g'=$[\eta]_{branched}/[\eta]_{linear}$, where $[\eta]_{branched}$ is the viscosity of the branched polymer at the given molecular weight slice, i, and $[\eta]_{linear}$ is the viscosity of the known linear reference polymer at the given molecular weight slice. And, the average branching index, $\langle g' \rangle$, of the entire polymer can be determined according to the formula $\langle g' \rangle$=$[\eta]_{branched}/[\eta]_{linear}$, where $[\eta]_{branched}$ is the viscosity of the branched polymer, and $[\eta]_{linear}$ is the viscosity of a known linear reference polymer, where the branched and linear polymers have the same molecular weight.

The viscosity average branching index ($\langle g' \rangle_{vis}$) of the entire polymer may be obtained from the following equation:

$$\langle g' \rangle vis = \frac{\sum C_i \cdot [\eta]_i}{\sum C_i \cdot [KM_i^\alpha]}$$

where Mi is the molecular weight of the polymer, $[\eta]_i$ is the intrinsic viscosity of the branched polymer at molecular weight Mi, $C_i$ is the concentration of the polymer at molecular weight Mi, and K and α are measured constants from a linear polymer as described by Paul J. Flory at page 310 of Principles Of Polymer Chemistry (1953), and the summation is over all the slices in the distribution. The $\langle g' \rangle_{vis}$ values are obtained while the polymer is in dilute solution within 1,2,4 trichlorobenzene, and the GPC-3D is calibrated with both polystyrene and low molecular weight polyethylene standards, the light scattering detector with a series of polymers of known molecular weight, and the differential viscometer with a series of polymers of known intrinsic viscosities.

These branched additives may range from amorphous polymers to semi-crystalline polymers that generally have a melt temperature (Tm) that is from about 40 to about 160° C., preferably from about 80 to about 150° C., and even more preferably from about 100 to about 140° C. The glass transition temperature (Tg) of these resins is from about −10 to about 10° C., preferably from about −5 to about 5° C., and even more preferably from about −2 to about 3° C. The crystallization temperature (Tc) of these branched resins is from about 80 to about 130° C., preferably from about 90 to about 120° C., and even more preferably from about 95 to about 115° C. as measured by DSC and cooled at 10° C./min.

Diene-modified polymers are preferably prepared by polymerizing one or more α-olefin monomers having at least 3 carbon atoms with at least one α-ω-diene by using a metallocene catalyst system. This synthetic method is disclosed in U.S. Pat. No. 5,670,595, which is incorporated herein by reference.

The α-olefins useful in producing the diene-modified polymers used in this invention have from 2 to 8 carbon atoms, more preferably 3, 4, 5, or 6 carbon atoms, and most preferably 3 carbon atoms. Exemplary α-olefins include ethylene, propylene, 1-butene, 1-hexene, 1-octene, 2-methyl-1-propene, 3-methyl-1-pentene, 4-methyl-1-pentene, 5-methyl-1-hexene, and mixtures thereof.

The dienes may be linear, cyclic, or multi-cyclic, and include conjugated linear dienes and fused and non-fused cyclic dienes. The dienes are preferably α-ω-dienes such as, but not limited to, 1,7-octadiene, 1,9-decadiene, 1,13-tetradecadiene, 1,8-nonadiene, 1,10-undecadiene, 1,11-dodecadiene, 1,15-hexadecadiene, 1,17-octadecadiene, and norbornadiene. More preferably, the dienes are selected from 1,7-octadiene, 1,9-decadiene, 1,13-tetradecadiene, and norbornadiene. Most preferably, the dienes are selected from 1,9-decadiene and 1,7-octadiene.

Any metallocene catalyst may be used to synthesize the diene-modified polymers. In this regard, the metallocene catalysts described above for the linear polymers may be used. Additionally, unbridged structures may be used. Examples of particularly preferred metallocenes are discussed in U.S. Pat. Nos. 4,530,914; 4,871,705; 4,937,299; 5,124,418; 5,107,714; 5,120,867; 5,278,119; 5,304,614; 5,324,800; 5,347,025; 5,350,723; 5,391,790; and 5,391,789; EP. Pub. Nos. 591 756; 520 732; and 420 436; and WO Pub. Nos. 91/40257; 93/08221; 93/08199; and 94/01471. Each of these references are incorporated herein by reference. Particularly preferred metallocene components are those that are stereorigid and comprise a group 4, 5, or 6 transition metal. Examples include bis-cyclopentadienyl derivatives, such as bis-indenyl metallocene.

Any curative that is capable of curing or crosslinking the rubber employed in this invention may be used. Some non-limiting examples of these curatives include phenolic resins, peroxides, maleimides, and silicon-containing curatives.

Any phenolic resin that is capable of crosslinking a rubber polymer can be employed in practicing the present invention. U.S. Pat. Nos. 2,972,600 and 3,287,440 are incorporated herein in this regard. The preferred phenolic resin curatives can be referred to as resole resins and are made by condensation of alkyl substituted phenols or unsubstituted phenols with aldehydes, preferably formaldehydes, in an alkaline medium or by condensation of bi-functional phenoldialcohols. The alkyl substituents of the alkyl substituted phenols typically contain 1 to about 10 carbon atoms. Dimethylol phenols or phenolic resins, substituted in para-positions with alkyl groups containing 1 to about 10 carbon atoms are preferred. These phenolic curatives are typically thermosetting resins and may be referred to as phenolic resin curatives or phenolic resins. These phenolic resins are ideally used in conjunction with a catalyst system. For example, non-halogenated phenol curing resins are preferably used in conjunction with halogen donors and, optionally, a hydrogen halide scavenger. Where the phenolic curing resin is halogenated, a halogen donor is not required but the use of a hydrogen halide scavenger, such as ZnO, is preferred. For a further discussion of phenolic resin curing of thermoplastic vulcanizates, reference can be made to U.S. Pat. No. 4,311,628, which is incorporated herein by reference.

An example of a preferred phenolic resin curative is defined according to the general formula (I).

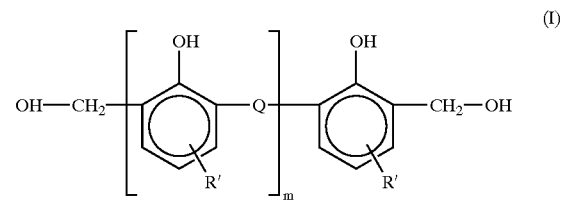

where Q is a divalent radical selected from the group consisting of —CH$_2$—, —CH$_2$—O—CH$_2$—; m is zero or a positive integer from 1 to 20 and R' is an organic radical. Preferably, Q is the divalent radical —CH$_2$—O—CH$_2$—, m is zero or a positive integer from 1 to 10, and R' is an organic radical having less than 20 carbon atoms. Still more preferably m is zero or a positive integer from 1 to 5 and R' is an organic radical having between 4 and 12 carbon atoms.

Peroxide curatives are generally selected from organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5 dimethyl 2,5-di(t-butylperoxy) hexane, 1,1-di(t-butylperoxy)-3,3,5-trimethyl cyclohexane, -butyl-4,4-bis(tert-butylperoxy)valerate, benzoyl peroxide, lauroyl peroxide, dilauroyl peroxide, 2,5-dimethyl-2,5-di (tert-butylperoxy) hexene-3, and mixtures thereof. Also, diaryl peroxides, ketone peroxides, peroxydicarbonates, peroxyesters, dialkyl peroxides, hydroperoxides, peroxyketals and mixtures thereof may be used. For a further discussion of peroxide curatives and their use for preparing thermoplastic vulcanizates, reference can be made to U.S. Pat. No. 5,656,693, which is incorporated herein by reference. When peroxide curatives are employed, the elastomeric copolymer will preferably include 5-ethylidene-2-norbornene as the diene component.

Useful silicon-containing curatives generally include silicon hydride compounds having at least two SiH groups. These compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis (dimethylsilyl)alkanes, bis(dimethylsilyl)benzene, and mixtures thereof.

Preferred silicon hydride compounds may be defined by the formula

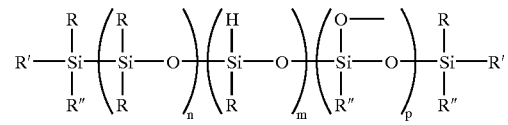

where each R is independently selected from alkyls containing 1 to 20 carbon atoms, cycloalkyls containing 4 to 12 carbon atoms, and aryls, m is an integer having a value ranging form 1 to about 50, n is an integer having a value ranging from 1 to about 50, and p is an integer having a value ranging from 0 to about 6.

As noted above, hydrosilation curing of the elastomeric polymer is preferably conducted in the presence of a catalyst. These catalysts can include, but are not limited to, peroxide catalysts and catalysts including transition metals of Group VIII. These metals include, but are not limited to, palladium, rhodium, and platinum, as well as complexes of these metals. Platinum catalysts are preferred. For a further discussion of the use of hydrosilation to cure thermoplastic vulcanizates, reference can be made to U.S. Pat. No. 5,936,028, which is incorporated herein by reference. When silicon-containing curatives are employed, the elastomeric copolymer employed will preferably include 5-vinyl-2-norbornene as the diene component.

Plasticizers, extender oils, synthetic processing oils, or a combination thereof may be employed in the compositions of the present invention. The extender oils may include, but are not limited to, aromatic, naphthenic, and paraffinic extender oils. The preferred synthetic processing oils are polylinear α-olefins. The compositions of this invention may include organic esters, alkyl ethers, or combinations thereof. U.S. Pat. No. 5,290,886 and 5,397,832 are incorporated herein in this regard. The addition of certain low to medium molecular weight organic esters and alkyl ether esters to the compositions of the invention dramatically lowers the Tg of the polyolefin and rubber components, and of the overall composition, and improves the low temperatures properties, particularly flexibility and strength. These organic esters and alkyl ether esters generally have a molecular weight that is generally less than about 10,000. It is believed that the improved effects are achieved by the partitioning of the ester into both the polyolefin and rubber components of the compositions. Particularly suitable esters include monomeric and oligomeric materials having an average molecular weight below about 2000, and preferably below about 600. The ester should be compatible, or miscible, with both the polyolefin and rubber components of the composition; i.e. that it mix with the other components to form a single phase. The esters found to be most suitable were either aliphatic mono- or diesters or alternatively oligomeric aliphatic esters or alkyl ether esters. Polymeric aliphatic esters and aromatic esters were found to be significantly less effective, and phosphate esters were for the most part ineffective.

In addition to the thermoplastic resins, rubber, curatives and optional extender oils, the compositions of the invention may also include reinforcing and non-reinforcing fillers, antioxidants, stabilizers, rubber processing oil, lubricants, antiblocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

Preferably, compositions of this invention will contain a sufficient amount of the rubber to form rubbery compositions of matter. The skilled artisan will understand that rubbery compositions of matter are those that have ultimate elongations greater than 100 percent, and that quickly retract to 150 percent or less of their original length within about 10 minutes after being stretched to 200 percent of their original length and held at 200 percent of their original length for about 10 minutes.

Accordingly, the thermoplastic elastomers of the present invention should comprise at least about 25 percent by weight rubber, preferably at least about 35 percent by weight rubber, even more preferably at least about 45 percent by weight rubber, and still more preferably at least about 50 percent by weight rubber. More specifically, the amount of rubber within the thermoplastic vulcanizate is generally from about 25 to about 90 percent by weight, preferably from about 45 to about 85 percent by weight, and more preferably from about 60 to about 80 percent by weight.

The thermoplastic elastomers of the present invention should generally comprise from about 10 to about 80 percent by weight of the thermoplastic resin based on the total weight of the rubber and thermoplastic resin combined. Preferably, the thermoplastic elastomers comprise from about 20 to about 60 percent by weight, more preferably from about 25 to about 40 percent by weight, and even more preferably from about 30 to about 35 percent by weight of the thermoplastic resin based on the total weight of the rubber and thermoplastic resin combined.

The thermoplastic elastomers should generally comprise from about 1 to about 25 percent by weight of the polymeric processing additive based on the total weight of the rubber and thermoplastic resin combined. Preferably, the thermoplastic elastomers comprise from about 1.5 to about 20 percent by weight, and more preferably from about 2 to about 15 percent by weight of the polymeric processing additive based on the total weight of the rubber and thermoplastic resin combined. Surprisingly, it has been found that the use of the branched polymeric processing additives requires only about one half of the amount of processing additive that is required when the linear polymeric processing additives of comparable MFR are employed.

The skilled artisan will be able to readily determine a sufficient or effective amount of vulcanizing agent to be employed without undue calculation or experimentation. The amount of vulcanizing agent should be sufficient to at least partially vulcanize the elastomeric polymer. Preferably, the elastomeric polymer is completely vulcanized.

Where a phenolic resin curative is employed, a vulcanizing amount curative preferably comprises from about 1 to about 20 parts by weight, more preferably from about 3 to about 16 parts by weight, and even more preferably from about 4 to about 12 parts by weight, phenolic resin per 100 parts by weight rubber.

Where a peroxide curative is employed, a vulcanizing amount of curative preferably comprises from about $1 \times 10^{-4}$ moles to about $2 \times 10^{-2}$ moles, more preferably from about $2 \times 10^{-4}$ moles to about $2 \times 10^{-3}$ moles, and even more preferably from about $7 \times 10^{-4}$ moles to about $1.5 \times 10^{-3}$ moles per 100 parts by weight rubber.

Where silicon-containing curative is employed, a vulcanizing amount of curative preferably comprises from 0.1 to about 10 mole equivalents, and preferably from about 0.5 to about 5 mole equivalents, of SiH per carbon-carbon double bond.

Generally, from about 5 to about 300 parts by weight, preferably from about 30 to about 250 parts by weight, and more preferably from about 70 to about 200 parts by weight, of extender oil per 100 parts rubber is added. The quantity of extender oil added depends upon the properties desired, with the upper limit depending upon the compatibility of the particular oil and blend ingredients; this limit is exceeded when excessive exuding of extender oil occurs. The amount of ester plasticizer in the composition will generally be less than about 250 parts, and preferably less than about 175 parts, per 100 parts rubber.

Fillers, such as carbon black, may be added in amount from about 10 to about 250, per 100 parts by weight of rubber. The amount of carbon black that can be used depends, at least in part, upon the type of carbon black and the amount of extender oil that is used. The amount of extender oil depends, at least in part, upon the type of rubber. High viscosity rubbers are more highly oil extendable.

Preferably, the rubber is crosslinked by dynamic vulcanization. The term dynamic vulcanization refers to a vulcanization or curing process for a rubber contained in a thermoplastic elastomer composition, wherein the rubber is vulcanized under conditions of high shear at a temperature above the melting point of the polyolefin component. The rubber is thus simultaneously crosslinked and dispersed as fine particles within the polyolefin matrix, although as noted above other morphologies may also exist. Dynamic vulcanization is effected by mixing the thermoplastic elastomer components at elevated temperature in conventional mixing equipment such as roll mills, Banbury mixers, Brabender mixers, continuous mixers, mixing extruders and the like. One method for preparing thermoplastic vulcanizates is described in U.S. Pat. No. 4,594,390, which is incorporated herein by reference.

Those ordinarily skilled in the art will appreciate the appropriate quantities, types of cure systems, and vulcanization conditions required to carry out the vulcanization of the rubber. The rubber can be vulcanized by using varying amounts of curative, varying temperatures, and a varying time of cure in order to obtain the optimum crosslinking desired.

Despite the fact that the rubber component is partially or fully cured, the compositions of this invention can be processed and reprocessed by conventional plastic processing techniques such as extrusion, injection molding, and compression molding. The rubber within the thermoplastic elastomers of this invention is usually in the form of finely-divided and well-dispersed particles of vulcanized or cured rubber, although a co-continuous morphology or a phase inversion is also possible.

The term vulcanized or cured rubber refers to an elastomeric polymer that has undergone at least a partial cure. The degree of cure can be measured by determining the amount gel, or conversely, the rubber that is extractable from the thermoplastic elastomer by using boiling xylene or cyclohexane as an extractant. This method is disclosed in U.S. Pat. No. 4,311,628. By using this method as a basis, the cured rubber of this invention will have a degree of cure where not more than 35 percent of the rubber is extractable, preferably not more than 15 percent, even more preferably not more than 10 percent, and still more preferably not more than 5 percent of the rubber is extractable. Alternatively, the degree of cure may be expressed in terms of crosslink density. Preferably, the crosslink density is from about 40 to about 160 moles per milliliter of rubber. All of these descriptions are well known in the art and described in U.S. Pat. Nos. 5,100,947 and 5,157,081, which are incorporated herein by reference.

The thermoplastic vulcanizates of this invention demonstrate improved processability and surface appearance. The improved processability is observed by either increased spiral flow, decreased ACR viscosity, or both. Spiral flow is a measure of the flow characteristics of a thermoplastic vulcanizate. Also, during extrusion of the thermoplastic vulcanizates, less pressure build up within the extruder and less current into the pumps, which is indicative of a composition that has improved processability. The improved surface appearance is observed by either decreased extrusion surface roughness, surface spot count, or both. Extrusion surface roughness is measure of surface texture as described in *Chemical Surface Treatments of Natural Rubber And EPDM Thermoplastic Elastomers: Effects on Friction and Adhesion,* Rubber Chemistry and Technology, Vol. 67, No. 4 (1994). Surface spot count is a visual measure of the number of surface spots on an extruded thermoplastic vulcanizate sample.

The thermoplastic vulcanizates of this invention are useful for making a variety of articles such as weather seals, hoses, belts, gaskets, moldings, boots, elastic fibers and like articles. They are particularly useful for making articles by blow molding, extrusion, injection molding, thermoforming, elasto-welding and compression molding techniques. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

In order to demonstrate the practice of the present invention, the following examples have been prepared and tested as described in the General Experimentation Section disclosed herein below. The examples should not, however, be viewed as limiting the scope of the invention. The claims will serve to define the invention.

GENERAL EXPERIMENTATION

Samples 1–13

Thermoplastic vulcanizates were prepared by using processing additives that are either linear or branched polymeric processing resins. Table I provides the characteristics of four of the processing additives that were used.

TABLE I

|  | Resin I | Resin II | Resin III | Resin IV |
| --- | --- | --- | --- | --- |
| Type | Branched | Branched | Linear | Linear |
| <g'> | 0.63 | 0.84 | 1.0 | 1.0 |
| MFR (dg/min) | 712 | 1132 | 700 | 1500 |
| Diene (ppm) | 1,066 | 553 | 0 | 0 |
| Mn | 24,000 | 19,000 | 22,600 | 17,000 |
| Mw | 86,000 | 57,000 | 65,500 | 55,000 |
| Mz | 335,000 | 141,000 | 107,000 | 90,000 |
| Mw/Mn | 3.58 | 3.00 | 2.90 | 3.24 |
| Mz/Mw | 3.9 | 2.47 | 1.68 | 1.64 |
| Tm (° C.) | 125 | 122 | 152 | 148 |
| Tc (° C.) | 92 | 86 | 105 | 104 |

Resin I and Resin II were prepared within a fully instrumented 0.5-liter Zipperclave reactor, rac-dimethylsilandiyl bis(indenyl)hafnium dimethyl (30 mg) was activated with dimethyl anilinium tetrakis (perfluorophenyl)borate (40 mg) in 100 ml toluene. The activated catalyst was loaded into the feed bomb for injection/metering by an HPLC pump. Hexane (11250 mL), propylene (3750 mL), triisobutylaluminum (4.64 mL of 25 weight percent solution in heptane), and 1,9-decadiene (16.0 mL for Resin I and 8.0 mL for Resin II) feeds were premixed in an 18-liter feed tank, and pressurized with nitrogen to 200 psig. A positive displacement pump was used to meter the feed into the reactor and to raise the pressure sufficiently to prevent bubbling of the reaction medium at reaction temperatures. In this way, liquid-full reaction was accomplished. Reactor pressure was controlled by using a downstream back-pressure regulator. Products were collected and solvent was vaporized in the hood. The resulting polymers were dried in a vacuum oven at 60° C. for 12 hours.

Resin III was obtained under the tradename Achieve 3925G™ (Exxon Mobil), and Resin IV was obtained under the tradename Achieve 3866™ (Exxon Mobil).

The thermoplastic vulcanizates included 100 parts by weight terpolymer rubber obtained under the tradename Vistalon™ (Exxon Mobil) with varying amounts of thermoplastic resin obtained under the tradename D008M™ polypropylene (Aristech Chemical Corp.; Pittsburgh, Pa.), varying amounts of the polymeric processing additives identified in Table 1, 5 parts by weight phenolic resin (Schenectady Int.; Schenectady, N.Y.), 2 parts by weight zinc oxide, 1.5 parts by weight tin dichloride dihydrate, and 107 parts by weight processing oil (Sunpar 150™). The thermoplastic resin D008M™ polypropylene was a linear polymer that had an MFR of about 0.8 dg/min., an $M_n$ of 119,100, an $M_w$ of 588,150, an $M_w/M_n$ of 4.93, and a melt temperature of 167° C.

Specifically, the rubber, thermoplastic resin, polymeric processing resin, and other additives were blended in an electrically heated Brabender mixer of 65–80 cm³ capacity, at a mixing speed of 100 rpm and a temperature of 120° to 190° C. Before melting the thermoplastic component, stannous chloride was added to the blend and mixing was continued. Phenolic resin curative was then added. The mixing temperature was observed as a function of time, and the onset of vulcanization was accompanied by a rapid increase in mixing torque at around 185° C. Mixing was stopped when the torque became relatively constant. The compositions were removed from the mixer and sheets were molded at 190° C. and used for measurement of physical properties.

Stress at 100 percent strain, tensile strength, and elongation at break where determined according to ASTM D-412 at 23° C. by using an Instron testing machine. Weight gain was determined according to ASTM D-471 after 24 hours at 125° C. Tension set was determined according to ASTM D-142. Toughness was determined according to ASTM D-1292. ACR viscosity, which is a measure of the shear viscosity of a thermoplastic vulcanizate at a fixed shear, was measured by using an automated capillary rheometer that was equipped with a number AX150 33/1 L/D ratio, 0.031 diameter orifice, at 204° C. and 118 kPa. Shore hardness was determined according to ASTM D-2240. 100% modulus was determined according to ASTM D-412. Tear strength was determined according to ASTM D-624. Also, MFR was determined according to ASTM D-1238, condition L, under 2,16 kg load at 230° C. by using an appropriate capillary tube.

The amount of the thermoplastic resin and the polymeric processing additive that was used in each sample is provided in Table II along with the results of the physical testing of each sample.

TABLE II

| Samples | 1 | 2 | 3 | 4 | 5 | 6 | 7 |
|---|---|---|---|---|---|---|---|
| Thermoplastic Resin (parts by weight) | 50.00 | 37.50 | 43.75 | 46.88 | 37.50 | 43.75 | 46.88 |
| Resin I (parts by weight) | 0.00 | 12.50 | 6.25 | 3.13 | 0.00 | 0.00 | 0.00 |
| Resin II (parts by weight) | 0.00 | 0.00 | 0.00 | 0.00 | 12.50 | 6.25 | 3.13 |
| Resin III (parts by weight) | 0.00 | 0.00 | 0.00 | 0.00 | 0.00 | 0.00 | 0.00 |
| Resin IV (parts by weight) | 0.00 | 0.00 | 0.00 | 0.00 | 0.00 | 0.00 | 0.00 |
| Shore A Hardness | 63 | 60 | 59 | 62 | 59 | 62 | 63 |
| ACR Viscosity (Poise) | 6034 | 1274 | 1966 | 3622 | 1227 | 2044 | 2981 |
| Stress at 100% strain (MPa) | 3.23 | 2.60 | 2.52 | 2.69 | 2.54 | 2.71 | 2.79 |
| Tensile Strength (MPa) | 6.81 | 5.46 | 5.10 | 5.84 | 5.50 | 5.85 | 6.64 |
| Elongation at Break (%) | 273 | 253 | 243 | 279 | 268 | 261 | 300 |
| Toughness (MPa) | 10.83 | 7.82 | 7.03 | 9.48 | 8.36 | 8.59 | 11.18 |
| Tension Set (%) | 6.0 | 5.5 | 5.5 | 5.0 | 5.5 | 5.5 | 5.5 |
| % Weight Gain 24 hrs. at 125° C. | 105 | 134 | 128 | 107 | 141 | 120 | 109 |
| Tear Strength (N/mm) | 19.00 | 16.97 | 17.70 | 18.23 | 16.65 | 19.12 | 19.67 |

| Samples | 8 | 9 | 10 | 11 | 12 | 13 |
|---|---|---|---|---|---|---|
| Thermoplastic Resin (parts by weight) | 37.50 | 43.75 | 46.88 | 37.50 | 43.75 | 46.88 |
| Resin I (parts by weight) | 0.00 | 0.00 | 0.00 | 0.00 | 0.00 | 0.00 |
| Resin II (parts by weight) | 0.00 | 0.00 | 0.00 | 0.00 | 0.00 | 0.00 |
| Resin III (parts by weight) | 12.50 | 6.25 | 3.13 | 0.00 | 0.00 | 0.00 |
| Resin IV (parts by weight) | 0.00 | 0.00 | 0.00 | 12.50 | 6.25 | 3.13 |
| Shore A Hardness | 64 | 63 | 64 | 65 | 63 | 65 |
| ACR Viscosity (Poise) | 2825 | 3892 | 4874 | 2548 | 3536 | 5677 |
| Stress at 100% strain (MPa) | 3.43 | 3.22 | 3.32 | 2.93 | 3.04 | 3.23 |
| Tensile Strength (MPa) | 5.93 | 6.24 | 6.27 | 5.75 | 6.43 | 6.37 |
| Elongation at Break (%) | 225 | 251 | 242 | 254 | 275 | 271 |
| Toughness (MPa) | 8.20 | 9.26 | 9.12 | 8.66 | 10.2 | 10.4 |
| Tension Set (%) | 6.0 | 5.0 | 7.0 | 5.0 | 5.0 | 6.0 |
| % Weight Gain 24 hrs. at 125° C. | 103 | 109 | 114 | 109 | 104 | 102 |
| Tear Strength (N/mm) | 16.56 | 18.70 | 19.20 | 17.63 | 17.79 | 18.60 |

Samples 14–35

In a similar fashion to Samples 1–13, additional thermoplastic vulcanizates were prepared by using branched polymeric processing resins, which are set forth in Table III.

TABLE III

|  | Resin V | Resin VI | Resin VII | Resin VIII | Resin IX | Resin X | Resin XI |
|---|---|---|---|---|---|---|---|
| Type | Branched | Branched | Branched | Branched | Branched | Branched | Branched |
| <g'> | 0.739 | 0.869 | 0.896 | 0.841 | 0.858 | 0.868 | 0.905 |
| MFR (dg/min) | 1,927 | — | — | — | — | — | — |
| Diene (ppm) | 752 | 752 | 752 | 1,615 | 972 | 972 | 972 |
| Polymerization Temperature (° C.) | 80 | 95 | 110 | 110 | 80 | 95 | 110 |
| Mn | 38,961 | 14,136 | 7,108 | 4,839 | 12,223 | 12,971 | 8,252 |
| Mw | 119,055 | 28,343 | 13,799 | 11,534 | 26,877 | 30,403 | 18,359 |
| Mz | 487,013 | 68,930 | 54,085 | 66,845 | 76,254 | 119,775 | 44,966 |
| Mw/Mn | 3.06 | 2.01 | 1.94 | 2.38 | 2.2 | 2.34 | 2.22 |
| Mz/Mw | 4.09 | 2.43 | 3.92 | 5.8 | 2.84 | 3.94 | 2.45 |
| Tm (° C.) | 119.68 | 101.44 | 75.72 | 76.1 | 100.41 | 96.88 | 103.7 |
| Tc (° C.) | 81.26 | 62.59 | 33.97 | 37.56 | 58.78 | 53.76 | 64.63 |

Resins V through XI were prepared in a similar fashion to the branched polymers of Resin I and II except that the amount of 1,9-decadiene and polymerization temperature were varied as set forth in Table III. Although the MFR data for these resins are not reported herein, they were well in excess of 1,000 dg/min.

The thermoplastic vulcanizates were prepared by using the same type and amount of rubber, phenolic resin, zinc oxide, oil, and tin dichloride dihydrate as employed in Samples 1–13. The amount of the thermoplastic resin and the polymeric processing additive that was used in each sample is provided in Table IV along with the results of the physical testing of each sample.

TABLE IV

| Samples | 14 | 15 | 16 | 17 | 18 | 19 | 20 | 21 | 22 | 23 | 24 |
|---|---|---|---|---|---|---|---|---|---|---|---|
| Thermoplastic Resin (parts by weight) | 50.00 | 46.88 | 43.75 | 37.50 | 46.88 | 43.75 | 37.50 | 46.88 | 43.75 | 37.50 | 46.88 |
| Resin V (parts by weight) | 0.00 | 3.13 | 6.25 | 12.50 | 0.00 | 0.00 | 0.00 | 0.00 | 0.00 | 0.00 | 0.00 |
| Resin VI (parts by weight) | 0.00 | 0.00 | 0.00 | 0.00 | 3.13 | 6.25 | 12.50 | 0.00 | 0.00 | 0.00 | 0.00 |
| Resin VII (parts by weight) | 0.00 | 0.00 | 0.00 | 0.00 | 0.00 | 0.00 | 0.00 | 3.13 | 6.25 | 12.50 | 0.00 |
| Resin VIII (parts by weight) | 0.00 | 0.00 | 0.00 | 0.00 | 0.00 | 0.00 | 0.00 | 0.00 | 0.00 | 0.00 | 3.13 |
| Resin IX (parts by weight) | 0.00 | 0.00 | 0.00 | 0.00 | 0.00 | 0.00 | 0.00 | 0.00 | 0.00 | 0.00 | 0.00 |
| Resin X (parts by weight) | 0.00 | 0.00 | 0.00 | 0.00 | 0.00 | 0.00 | 0.00 | 0.00 | 0.00 | 0.00 | 0.00 |
| Resin XI (parts by weight) | 0.00 | 0.00 | 0.00 | 0.00 | 0.00 | 0.00 | 0.00 | 0.00 | 0.00 | 0.00 | 0.00 |
| Shore A Hardness | 60 | 61 | 62 | 63 | 61 | 62 | 62 | 64 | 61 | 60 | 59 |
| ESR ($R_a$) (microns) | 430 | 302 | 297 | 189 | 259 | 248 | 233 | 161 | 294 | 336 | 319 |
| ACR Viscosity (Poise) | 6864 | 2759 | 2409 | 1552 | 2169 | 1466 | 959 | 2068 | 1698 | 1395 | 1349 |
| Stress at 100% strain (MPa) | 3.21 | 3.39 | 3.24 | 3.24 | 2.89 | 2.73 | 3.34 | 3.70 | 3.26 | 2.81 | 2.97 |
| Tensile Strength (MPa) | 6.59 | 6.46 | 4.59 | 5.51 | 5.00 | 4.51 | 4.14 | 5.63 | 5.76 | 5.40 | 5.81 |
| Elongation at Break (%) | 258 | 241 | 168 | 222 | 209 | 200 | 144 | 186 | 223 | 242 | 248 |
| Toughness (MPa) | 9.72 | 9.19 | 4.78 | 7.40 | 6.15 | 5.34 | 3.71 | 6.43 | 7.58 | 7.56 | 8.41 |
| Tension Set (%) | 5.0 | 5.0 | 5.0 | 6.0 | 5.0 | 6.0 | 5.0 | 5.5 | 5.0 | 5.0 | 5.5 |
| % Weight Gain 24 hrs. at 125° C. | 105 | 100 | 107 | 121 | 102 | 109 | 121 | 101 | 106 | 113 | 112 |
| Tear Strength (N/mm) | 19.07 | 18.60 | 17.34 | 19.89 | 17.49 | 18.39 | 15.49 | 18.28 | 19.44 | 18.26 | 16.14 |

| Samples | 25 | 26 | 27 | 28 | 29 | 30 | 31 | 32 | 33 | 34 | 35 |
|---|---|---|---|---|---|---|---|---|---|---|---|
| Thermoplastic Resin (parts by weight) | 43.75 | 37.50 | 46.88 | 43.75 | 37.50 | 46.88 | 43.75 | 37.50 | 46.88 | 43.75 | 37.50 |
| Resin V (parts by weight) | 0.00 | 0.00 | 0.00 | 0.00 | 0.00 | 0.00 | 0.00 | 0.00 | 0.00 | 0.00 | 0.00 |
| Resin VI (parts by weight) | 0.00 | 0.00 | 0.00 | 0.00 | 0.00 | 0.00 | 0.00 | 0.00 | 0.00 | 0.00 | 0.00 |
| Resin VII (parts by weight) | 0.00 | 0.00 | 0.00 | 0.00 | 0.00 | 0.00 | 0.00 | 0.00 | 0.00 | 0.00 | 0.00 |
| Resin VIII (parts by weight) | 6.25 | 12.50 | 0.00 | 0.00 | 0.00 | 0.00 | 0.00 | 0.00 | 0.00 | 0.00 | 0.00 |
| Resin IX (parts by weight) | 0.00 | 0.00 | 3.13 | 6.25 | 12.50 | 0.00 | 0.00 | 0.00 | 0.00 | 0.00 | 0.00 |
| Resin X (parts by weight) | 0.00 | 0.00 | 0.00 | 0.00 | 0.00 | 3.13 | 6.25 | 12.50 | 0.00 | 0.00 | 0.00 |
| Resin XI (parts by weight) | 0.00 | 0.00 | 0.00 | 0.00 | 0.00 | 0.00 | 0.00 | 0.00 | 3.13 | 6.25 | 12.50 |
| Shore A Hardness | 57 | 55 | 62 | 62 | 60 | 61 | 64 | 60 | 63 | 60 | 61 |
| ESR ($R_a$) (microns) | 329 | 251 | 355 | 246 | 273 | 274 | 234 | 206 | 379 | 332 | 240 |
| ACR Viscosity (Poise) | 1090 | 1048 | 2156 | 1716 | 844 | 1518 | 1431 | 1011 | 1936 | 1437 | 1097 |
| Stress at 100% strain (MPa) | 2.72 | 2.45 | 2.96 | 2.77 | 2.69 | 3.17 | 3.10 | 2.85 | 3.19 | 3.59 | 2.97 |
| Tensile Strength (MPa) | 4.27 | 4.00 | 5.67 | 5.18 | 4.65 | 5.19 | 5.35 | 4.63 | 6.27 | 5.54 | 3.71 |
| Elongation at Break (%) | 187 | 193 | 234 | 245 | 212 | 200 | 212 | 194 | 236 | 189 | 150 |
| Toughness (MPa) | 4.76 | 4.53 | 7.62 | 7.62 | 5.86 | 6.11 | 6.69 | 5.31 | 8.43 | 6.30 | 3.60 |
| Tension Set (%) | 5.0 | 5.0 | 5.0 | 5.0 | 5.0 | 5.0 | 5.0 | 5.0 | 5.0 | 5.0 | 5.0 |
| % Weight Gain 24 hrs. at 125° C. | 124 | 119 | 101 | 106 | 119 | 109 | 109 | 120 | 104 | 108 | 124 |
| Tear Strength (N/mm) | 14.90 | 15.57 | 19.48 | 16.53 | 16.83 | 18.35 | 17.40 | 15.37 | 17.01 | 17.47 | 15.79 |

Samples 36–41

In a similar fashion to the preceding samples, thermoplastic vulcanizates were prepared by using the linear processing additives identified in Table I as Resin III and Resin IV. Samples 36 and 39 are controls.

The recipe for each sample is set forth in Table V, and the results of the physical testing are set forth in Table VI. The thermoplastic vulcanizates were prepared in a similar fashion to the preceding samples except that a large-scale, high shear extruder was used to mix the ingredients as described in U.S. Pat. No. 4,594,390.

Spiral flow measurements were conducted as follows. A sample of dry thermoplastic vulcanizate is loaded into the hopper of a 136 metric ton injection molding machine (Newbury H6-150ARS) having a 45 mm screw diameter, a screw length/diameter ratio of 16:1 to 20:1, a compression ratio of 2.5:1, a maximum injection pressure of 1950 psi, and an initial inject timer with the capability of adjusting to 0.01 seconds accuracy. Attached to the injection molding machine is a single cavity spiral flow mold (Master Unit Die 84/90-001) equipped with a mold temperature controller. The heat zones of the molding machine are set to achieve an actual melt temperature of about 195° C., both the initial inject and overall inject timers are set for three seconds, and the cure timer is set for 25–30 seconds. Other melt temperatures may be selected depending on the material. The injection pressure is adjusted according to the desired measurement, e.g., 450 psi, 950 psi, and 1,450 psi. Fifteen transition shots are molded into the single cavity spiral flow mold and five samples are recorded for flow length and cavity pressures.

The surface spot count provides a quantitative measurement of the surface spots of an extruded elastomeric strip through the use of a visual inspection standard. In performing the test, a 1 inch or 1½ inch diameter extruder equipped with a 24:1 length/diameter screw having a 3–3.5 compression ratio was used. The extruder is fitted with a strip die that is 25.4 mm wide×0.5 mm thick×7–10 mm land length. A breaker plate is used with the die, but no screen pack is placed in front of the breaker plate. In preparing the extrudate, a temperature profile is employed to give a melt temperature of 200° C.+/−3° C. A hand-held temperature probe should be used to establish the melt temperature. With the extruder having three temperature zones within the feed zone, zone 1 should be set to 180° C., zone 2 should be set to 190° C., and zone 3 should be set to 200° C. The fourth zone, which is the die zone, should be set to 205° C. These temperatures should be controlled to +/−6° C. When the zone temperatures have reached their set points, the screw should be started and about 1 kg of the sample should be loaded into the feed hopper. The extruder screw speed should be set to maintain an output of approximately 50 g+/−5 g per minute. The material should be allowed to flush through the extruder for at least five minutes before collecting any sample.

After the flow rate is adjusted to 50 g per minute and the extruder has been flushed for five minutes, all previously extruded material is removed and the strip is allowed to extrude to the floor, which will allow the weight of the strip to slightly draw down the profile and thereby counteract any differences in the material's velocity across the die face. By using a piece of cardboard that is long enough to collect a 12 inch sample, the upper edge of the cardboard should be moved into the extrudate while quickly rotating the bottom of the cardboard into the strip, thereby avoiding any further draw down. Both ends of the strip should be cut past the edges of the cardboard and allowed to cool. Three strips approximately 30–61 cm in length are prepared. Six inch sections of each strip are randomly chosen for counting the spots. The spots should be counted under bright light conditions with a 3 diopter magnification. To provide good contrast, the strips may be colored with black ink. All visible spots within the 6 inch section should be counted. The results of the three strips are averaged and rounded to the nearest whole number.

Extrusion surface roughness was measured as described in *Chemical Surface Treatments of Natural Rubber And EPDM Thermoplastic Elastomers: Effects on Friction and Adhesion,* Rubber Chemistry and Technology, Vol. 67, No. 4 (1994).

Finally, the processing characteristics of the thermoplastic vulcanizates were observed by monitoring certain characteristics of the thermoplastic vulcanizate within the extruder. Namely, the pressure within the final barrel was monitored. Also, the pressure before the screen changer, which was located upstream from the final barrel, was monitored. And, the current drawn by the melt gear pump, which was positioned between the final barrel and screen changer, was also monitored. The processing data that was collected is set forth in Table VI.

TABLE V

| Samples | 36 | 37 | 38 | 39 | 40 | 41 |
|---|---|---|---|---|---|---|
| Ingredients/Parts by Weight | | | | | | |
| EPDM | 100 | 100 | 100 | 100 | 100 | 100 |
| Processing Oil | 130 | 130 | 130 | — | — | — |
| Plasticizer | — | — | — | 130 | 130 | 130 |
| Wax | 5 | 5 | 5 | — | — | — |
| Filler | 10 | 10 | 10 | 10 | 10 | 10 |
| $SnCl_2 \cdot 2H_2O$ | 1.26 | 1.26 | 1.26 | 1.26 | 1.26 | 1.26 |
| ZnO | 2 | 2 | 2 | 2 | 2 | 2 |
| Phenolic Curative | 6 | 6 | 6 | 6 | 6 | 6 |
| Thermoplastic Resin | 41 | 35 | 35 | 50 | 44 | 44 |
| Resin III | — | 6 | — | — | 6 | — |
| Resin IV | — | — | 6 | — | — | 6 |

TABLE VI

| Samples | 36 | 37 | 38 | 39 | 40 | 41 |
|---|---|---|---|---|---|---|
| Shore A Hardness | 66 | 65 | 64 | 59 | 57.6 | 61 |
| ESR ($R_a$) | 117 | 74 | 64 | 207 | 159 | 138 |
| ACR Viscosity (Poise) | 367 | 335 | 302 | 308 | 226 | 244 |
| Modulus at 100% (MPa) | 2.37 | 2.29 | 2.21 | 1.85 | 1.68 | 1.99 |
| Ultimate Tensile Strength | 6.55 | 5.91 | 5.29 | 4.24 | 3.42 | 4.85 |
| Elongation at Break (%) | 465 | 443 | 427 | 285 | 258 | 314 |
| Tension Set (%) | 10 | 8 | 8 | 9 | 9 | 9 |
| Spiral Flow | | | | | | |
| Inches @ 400° F. @ 450 psi | 11.3 | 12.0 | 12.2 | 12 | 14 | 14 |
| Inches @ 400° F. @ 950 psi | 28.1 | 29.3 | 30.0 | 28 | 30 | 31 |
| Inches @ 400° F. @ 1450 psi | 40.6 | 42.5 | 43.2 | 40 | 43 | 44 |
| Processing Data | | | | | | |
| Barrel Pressure (MPa) | — | — | — | 2.86 | 1.45 | 2.18 |
| Screen Changer Pressure (MPa) | — | — | — | 7.65 | 5.38 | 5.58 |
| Melt Gear Amps | — | — | — | 31.3 | 22.37 | 21.85 |
| Spot Count | 60 | 15 | 12 | | | |

While the best mode and preferred embodiment of this invention have been set forth with the patent statutes, the scope of this invention is not limited thereto, but rather is defined by the attached claims. Thus, the scope of the invention includes all modification or variations that may fall within the scope of the claims.

What is claimed is:

1. A thermoplastic elastomer formed by a process comprising the steps of:
   dynamically vulcanizing a rubber within a mixture that includes the rubber, from about 10 to about 80 percent by weight of a thermoplastic resin based upon the total weight of the rubber and the thermoplastic combined, and from about 1 to about 25 percent by weight of a polymeric processing additive based upon the total weight of the rubber and the thermoplastic combined, where the polymeric processing additive is a linear polyolefin resin that has an melt flow rate that is greater than about 1,000 dg/min, a diene-modified polyolefin polymer that has an melt flow rate that is greater than about 1,000 dg/min, from about 0.005 to about 2.00 mole percent polymeric units deriving from dienes, and a viscosity average branching index that is from about 0.4 to about 0.95, or a mixture of the linear polyolefin resin and the diene-modified polyolefin polymer, where the step of dynamically vulcanizing the rubber results in vulcanized rubber having a crosslink density of about 40 to about 180 mole per milliliter of rubber.

2. A composition comprising:
   a dynamically vulcanized rubber;
   a thermoplastic resin, and
   a polymeric olefin processing additive that has a melt flow rate that is greater than about 500 dg/min.

3. The composition of claim 2, where the composition comprises from about 10 to about 80 percent by weight of said thermoplastic resin based upon the total weight of said vulcanized rubber and said thermoplastic resin combined, and from about 1 to about 25 percent by weight of said processing additive based upon the total weight of said vulcanized rubber and said thermoplastic resin combined.

4. The composition of claim 2, where said polymeric processing additive has a melt flow rate that is greater than about 1000 dg/min.

5. The composition of claim 4, where said polymeric processing additive has a melt flow rate that is greater than about 1200 dg/min.

6. The composition of claim 2, where said polymeric processing additive is a linear polyolefin.

7. The composition of claim 6, where said linear polyolefin is polypropylene.

8. The composition of claim 2 where said polymeric processing additive comprises diene-modified polyolefin polymers that are characterized by a viscosity average branching index of less than about 0.95.

9. The composition of claim 8, where said polymeric processing additive comprises diene-modified polyolefin polymers that are characterized by a viscosity average branching index from 0.2 to about 0.85.

10. The composition of claim 8, where said diene-modified polyolefin polymers are characterized by an $M_w$ of from about 25,000 to about 200,000, an $M_n$ of from about 10,000 to about 70,000, and an Mz of from about 60,000 to about 800,000, as determined by using GPC analysis with both polystyrene and low molecular weight polyethylene standards.

11. The composition of claim 10, where said diene-modified polyolefin polymers contain diene monomeric units deriving from 1,9-decadiene, 1,13-tetradecadiene, 1,7-octadiene, or 1,5-hexadiene.

12. The composition of claim 10, where said diene-modified polyolefin polymers contain from about 0.01 to about 1.0 mole percent polymeric units deriving from dienes.

13. The composition of claim 12, where said diene-modified polyolefin polymers contain from about 0.02 to about 0.1 mole percent polymeric units deriving from dienes.

14. The composition of claim 2, where said vulcanized rubber is an elastomeric copolymer polymerized from ethylene, at least one α-olefin monomer, and at least one diene, where said thermoplastic resin is polypropylene, and where said polymeric processing additive is a diene-modified polypropylene.

15. The composition of claim 2, where said vulcanized rubber has a crosslink density from about 40 to about 180 moles per milliliter of rubber.

16. The composition of claim 2, where said vulcanized rubber has a degree of cure where not more than 15 percent of the rubber is extractable in boiling xylene or cyclohexane.

17. The composition of claim 16, where said vulcanized rubber has a degree of cure where not more than 10 percent of the vulcanized rubber is extractable by using boiling xylene or cyclohexane.

18. The composition of claim 2 where the rubber is a terpolymer of ethylene, propylene, and 5-ethylidene-2-norbornene or 5-vinyl-2-norbornene, and the thermoplastic resin is polypropylene.

19. A process for forming a thermoplastic elastomer comprising the step of:

dynamically vulcanizing a rubber within a mixture that includes the rubber, a thermoplastic resin, and a polymeric processing additive, where said polymeric processing additive includes a linear polyolefin having a melt flow rate that is greater than about 500 dg/min, branched polyolefin characterized by a viscosity average branching index of less than about 0.85 and melt flow rate that is greater than about 500 dg/min, or a mixture of both linear polyolefin and the branched polyolefin.

* * * * *